US005364412A

United States Patent [19]

Furukawa

[11] Patent Number: 5,364,412

[45] Date of Patent: Nov. 15, 1994

[54] PROCESS FOR PRODUCING DYED LAMINATED PRODUCTS

[76] Inventor: Kenichi Furukawa, 6-7-2, Ohjidai, Sakura-Shi, Chiba-Ken, Japan

[21] Appl. No.: 992,841

[22] Filed: Dec. 16, 1992

[51] Int. Cl.[5] .......................... D06P 1/00; B32B 27/00

[52] U.S. Cl. .......................... 8/471; 8/467; 428/290; 428/914

[58] Field of Search .......................... 8/471, 467; 428/914, 428/288, 290

[56] References Cited

U.S. PATENT DOCUMENTS

| | | | |
|---|---|---|---|
| 3,363,557 | 1/1968 | Blake | 8/471 |
| 3,952,131 | 4/1976 | Sideman | 8/471 |
| 4,059,471 | 11/1977 | Haigh | 8/471 |
| 4,354,851 | 10/1982 | Hix et al. | 8/471 |
| 4,395,263 | 7/1983 | Davis | 8/471 |
| 4,731,091 | 3/1988 | Majima | 8/471 |
| 4,943,684 | 7/1990 | Kramer | 8/471 |
| 5,128,311 | 7/1992 | Egashira et al. | 428/914 |

*Primary Examiner*—Paul Lieberman
*Assistant Examiner*—Caroline L. Dusheck
*Attorney, Agent, or Firm*—Joseph C. Mason, Jr.; Ronald E. Smith

[57] ABSTRACT

A process for producing a dyed article having a substrate laminated with a fluororesin film comprises the steps of: providing a substrate having laminated thereon a fluororesin film through an adhesive layer; contacting an original having a pattern or image formed with a sublimating or volatile dye with a surface of said fluororesin film opposite to said adhesive layer; heating said original to allow said dye to permeate said fluororesin film; and allowing said dye to be trapped by at least one of said adhesive layer and said substrate to transfer the pattern or image of the original thereto. According to the process, designs of an original can faithfully be transferred to a substrate for dyeing having any desired substrate on which a fluororesin film having high resistances to light, solvents, heat and stains is laminated.

8 Claims, No Drawings

PROCESS FOR PRODUCING DYED LAMINATED PRODUCTS

BACKGROUND OF THE INVENTION

1. Field of the Invention

The present invention relates to dyed goods or articles having improved weatherability which have laminated thereon a fluororesin film and also have therein dyed designs faithfully transferred directly from the original.

2. Description of Related Art

Fluororesin films have excellent resistances to light, solvents, heat and stains, and are utilized widely as a laminating film material for endowing high weatherability to articles to be laminated. However, the fluororesins are difficult to form on the surface thereof designs such as designs directly applied and fixed firmly thereto by printing or the like method since they have low surface energies. Substrates on which designs can be formed, for example, by printing include, for example, sheets for tents, aluminum plates, and flexible sheets made of a fabric such as a cloth impregnated with a polyvinyl chloride-based resin.

However, printed matters using such flexible substrates are susceptible to staining on their surface and also to fading with ultraviolet rays when used outdoors as advertisement or for other purposes.

To prevent the surface of the printed matters from staining, it was a conventional measure to laminate a fluororesin film on the designs formed on the substrate. On the other hand, fluororesin films containing an ultraviolet absorbent were used for the lamination in order to prevent the fading of the printed matter.

The process in which the substrate having formed thereon designs in advance is laminated requires a step of forming designs on a substrate and a step of laminating a fluororesin film thereon. In particular, in the case of a single piece production or a small lot production of large signboards, for example, for outdoor advertisement, formation of firmly applied designs on a substrate suitable for the desired use by painting or by any other printing method using no printing plate or block (such as ink jet printing) must be followed by a large scale lamination of a resin. This requires a long time for production and makes the production cost high.

SUMMARY OF THE INVENTION

The present inventor has made intensive research with a view to overcoming the above-mentioned drawbacks of the prior art. As a result he has now found that when a substrate for dyeing obtained by laminating in advance a fluororesin film thereon by a continuous, mechanical operation is heated after intimately contacting an original painted with a sublimating or volatile dye with simultaneous heating under certain conditions, the dye permeates through the fluororesin film and migrates into the inside and is absorbed or trapped by the material having affinity for the dye so that the original can be transferred to the substrate faithfully, thus, giving dyed goods laminated with a fluororesin film a satisfactory weatherability. The present invention is based on this discovery.

The transfer dyeing technique used in the present invention is a technique in which designs are printed on a transfer paper with an ink containing a sublimating dye as a coloring material, and the transfer paper carrying the designs are contacted with heating on a good or article made of fabric or film of a polyester resin, on which the designs are to be transferred to sublimate the dye to thereby dye the good or article. This type of dyeing is considered to be based on the principle that the dye molecules sublimating or diffusing with heat infiltrate into noncrystalline portion or micelles of the resin swelled by the heat and entrapped therein.

As far as the present inventor knows, no technology which teaches nor prior art which suggests the combination of (a) the integration of any desired substrate with a fluororesin film by lamination with an adhesive in advance to utilize the film as a protective film endowing the substrate with high weatherability, (b) the dyeing of the adhesive layer bonding the substrate and the fluororesin film from the side of the resin film at high color density and at high stability, and (c) the use of a fluororesin film containing an ultraviolet absorbent to thereby produce laminated dyed goods having a structure allowing for high resistances to staining and light.

DETAILED DESCRIPTION OF THE INVENTION

Therefore, the present invention provides the following processes:

(1) A process for producing a dyed article having a substrate laminated with a fluororesin film, comprising the steps of: providing a substrate having laminated thereon a fluororesin film through an adhesive layer; contacting an original having a design formed with a sublimating or volatile dye with a surface of the fluororesin film opposite to the adhesive layer; heating the original to allow the dye to permeate the fluororesin film; and allowing the dye to be trapped by at least one of the adhesive layer and the substrate to transfer the pattern or image of the original thereto.

(2) The process as described in (1) above, wherein substrate is selected from the group consisting of a fabric, a metal, a plastic, a wood, a ceramic, a hide, paper, and a release sheet.

(3) The process as described in (1) above, wherein the adhesive layer comprises an adhesive or a pressure-sensitive adhesive selected from the group consisting of a polyester resin and an acrylic resin.

(4) The process as described in (2) above, wherein the substrate is made of a material having an affinity for the sublimating or volatile dye.

(5) The process as described in (4) above, wherein the material having an affinity for the sublimating or volatile dye is a material selected from the group consisting of a polyester resin, and an acrylic resin.

(6) The process as described in (3) above, wherein the adhesive layer is a layer having an affinity for the sublimating or volatile dye.

(7) The process as described in (1) above, wherein the fluororesin film is a polyvinyl fluoride film.

(8) The process as described in (7) above, wherein the polyvinyl fluoride film contains an ultraviolet absorbent.

According to the process of the present invention, the adhesive layer or substrate itself which has an affinity for the dye and is present inside the fluororesin film laminating on the good or article can be dyed by a transfer method. The dyed article obtained according to the process of the present invention enables production of laminated dyed articles having high resistances to solvents and to friction in contrast to those articles on whose surfaces the designs are simply printed. In this case, the use of a fluororesin film containing an ultraviolet absorbent cuts ultraviolet rays off, resulting in improved resistance to light. The dyed goods obtained according to the invention are unexposed to the air; this adds greatly to the prevention of the occurrence of the phenomenon of blackening of the dye with nitrogen monoxide or dioxide in the air, which is a defect of sublimating or volatile dyes.

The sublimating or volatile dye which can be used for forming an original design on transfer paper to be employed in the process of the invention includes those dyes which sublimate or evaporate at a temperature within the ranges of between 70° C. and 260° C. at an atmospheric pressure.

Examples of such dyes include azo dyes, anthraquinone, quinophthalone, styryl, di- or triphenylmethane, oxazine, triazine, xanthene, methine, azomethine, acridine, diazine, 1,4-dimethylaminoanthraquinone, 1,5-dihydroxy-4,8-diaminoanthraquinone bromide or chloride, 1,4-diamino-3,3-dichloroanthraquinone, 1-aminohydroxyanthraquinone, 1-amino-4-hydroxy-2-(β-methoxyethoxy)anthraquinone, methyl, ethyl, propyl, or butyl 1,4-diaminoanthraquinone-2-carboxylate, 1-amino-4-anilidoanthraquinone, 1-amino-2-cyano-4-anilido(or cyclohexylamino)anthraquinone, 1-hydroxy-2-(p-acetaminophenylazo)-4-methylbenzene, 3-methyl-4-(nitrophenylazo)pyrazolone, 3-hydroxyquinophthalone, etc., malachite green, methyl violet, basic dyes modified with sodium acetate, sodium ethanolate, sodium methanolate, etc.

The substrate for dyeing which can be used in the process of the invention includes a substrate on which a fluororesin film is laminated through an adhesive layer.

Here, the fluororesin film used as a laminating material is a film which has no affinity for the above-mentioned dyes and which permits permeation of the dyes in the step of thermal transfer of the designs of the original.

The fluororesin film allows the dye gasified with heating to permeate therethrough with almost no retention therein, and the dye is adsorbed by the adhesive layer having an affinity for the dye.

Specific examples of the fluororesin which can be used in the form of a film in the present invention include polyvinyl fluoride, polyvinylidene fluoride, polytetrafluoroethylene, tetrafluoroethylene/perfluoroalkyl vinyl ether copolymer, tetrafluoroethylene/hexafluoropropylene copolymer, tetrafluoroethylene/ethylene copolymer, polychlorotrifluoroethylene, and the like singly or as mixtures. Alternatively, laminates of two or more of these resins may also be used. The fluororesin films may be selected appropriately from commercially available ones.

The thickness of the fluororesin films may be 3 to 30 μm, and preferably 5 to 20 μm. If the thickness is smaller than 3 μm, protection of the designs will be insufficient. On the other hand, if it is larger than 30 μm, permeation of the gasified dye is aggravated, which makes the transfer insufficient.

Those fluororesin films which contain an ultraviolet absorbent may be used preferably. Specific examples of such fluororesin films include UV-absorbent-containing polyvinyl fluoride films commercially available under trade names TEDLAR UT or UA (both products by Du Pont).

The use of an adhesive or pressure-sensitive adhesive that has an affinity for the dyes exhibits excellent effects for color development of dyes at high color density and for stable carrying of the developed color.

The adhesive or pressure-sensitive adhesive which can be used includes thermoplastic adhesives, for example, polyvinyl acetate copolymer, polyvinyl alcohol, polyvinyl formal, polyvinyl butyral, acrylic adhesive, ethylene/vinyl acetate copolymer, ethylene/vinyl alcohol copolymer, ethylene/ethyl acrylate copolymer, ethylene/acrylic acid copolymer, vinyl chloride/vinyl acetate copolymer, vinyl chloride/vinyl acetate/maleic anhydride terpolymer, polyvinyl ether, polyester resin (saturated amorphous polyester), cellulose derivatives, etc.

Among them, acrylic or polyester based thermoplastic resin adhesives or pressure-sensitive adhesives are preferred. Specific examples of such adhesives include polyester resin KF-4000 (melting point: 140° C., produced by Toray Limited), and Vironal MD-1200 (softening point: 160° C., produced by Toyobo Co., Ltd.). The pressure-sensitive adhesive is preferably an acrylic pressure-sensitive adhesive having excellent weatherability and heat resistance, for example, Three Bond 1548 aqueous emulsion pressure-sensitive adhesive (produced by Three Bond Co., Ltd.), No.4580 hot melt pressure-sensitive adhesive (produced by No-tape Industry Co., Ltd.).

In the present invention, those adhesives or pressure-sensitive adhesives that have an affinity for the dyes are used, which allows dyeing of the adhesive layer, and hence any types of substrates can be used. Examples of the substrate include fabrics, metals, plastics, woods, ceramics, hides, paper, release sheets, etc.

When a release sheet is used as a substrate, it is laminated on a fluororesin film through a pressure-sensitive adhesive after priming the surface of the film. The resulting laminate comprising the fluororesin film, pressure-sensitive adhesive layer and release sheet is subjected to dyeing of the adhesive layer by transfer, and then the release sheet is removed, with the dyed, selfadhesive surface being laminated on a desired material or member for use.

In the present invention, no adhesive nor pressure-sensitive adhesive have to be used when the substrate for dyeing itself that has an affinity for the dye is adhered to the fluororesin film. In this case, the substrate itself serves as an adhesive or pressure-sensitive adhesive as well. This embodiment is also included in the scope of the present invention.

To transfer the design of an original formed with the sublimating or volatile dye to the adhesive layer or substrate itself, it is sufficient to contact the original with the surface of the fluororesin film of the substrate and hold it in that state at a temperature between 100° C. and 180° C. for 10 to 60 seconds.

In the present invention, for forming designs with the sublimating or volatile dye using no printing plate or block, it is convenient to follow the electrostatic image textile printing method (cf. Japanese Patent Application Laid-Open No. 18866/1991) or the sublimation transfer method (cf. Japanese Patent Publication No. 58080/1989).

The former method is to form electrostatic charge image directly on an electrostatic recording paper by applying an electric field thereto using a wet-type electrostatic recording method or monochromatic or color electrostatic plotter or facsimile, and using as a transfer paper the electrostatic recording paper developed with a liquid developer containing a dispersed dye. As such, use may be made of an apparatus commercialized under the trade name Juana (produced by Nippon Steel Co., Ltd.).

The latter method is a method in which a transfer paper is printed using a thermal printer with a hot-melt transfer ink ribbon containing a dispersed dye. Print Works (trade name for a product by Nippon Electro Calculation Co., Ltd.) may be used.

DESCRIPTION OF PREFERRED EMBODIMENTS

Hereinafter, the present invention will be described in greater detail by examples. However, it should not be construed that the present invention is limited thereto.

EXAMPLE 1

A substrate for dyeing was prepared by laminating a polyvinyl fluoride film (TEDLAR, trade name, for a product by Du Pont) of 12 μm thick a sheet for tent made of cotton fiber with a polyester adhesive (KF-4000, trade name for a product by Toray Limited).

This laminated substrate was contacted with a transfer paper carrying a color original outputted by Print Works described above using a sublimating dispersed dye (RED-B, trade name for a product by Nippon Kayaku Co., Ltd.) as a dyeing agent. After being heated at 180° C. for 20 seconds, the transfer paper was peeled off. When the TEDLAR film was forcibly peeled off from the tent sheet, it revealed that the tent sheet with which the adhesive had been melt-bonded was dyed to a high color density whereas the bond surface of the TEDLAR film was dyed only palely.

On the other hand, the TEDLAR film was laminated on the tent sheet using no adhesive, and the transfer paper was contacted thereon. The resulting laminate was heated in the same manner as above and the transfer paper was peeled off.

Comparing the tent sheet melt-bonded using the adhesive and the tent sheet using no adhesive, it revealed that the adhesive layer portion of the former tent sheet was dyed to a high color density while the latter tent sheet was scarcely dyed. The TEDLAR film on the former tent sheet was dyed only palely in contrast to that of the latter tent sheet which was dyed to a high color density.

EXAMPLE 2

A substrate for dyeing was prepared by laminating the same TEDLAR film (thickness: 12 μm) as used in Example 1 on an aluminum plate with a polyester adhesive (Vironal MD-1200, produced by Toyobo Co., Ltd.).

The same transfer paper as used in Example 1 was contacted on this laminated substrate. After being heated at 180° C. for 20 seconds the transfer paper was peeled off. When the TEDLAR film was forcibly peeled off from the aluminum plate, it was observed that the adhesive layer portion of the substrate was dyed to a high color density while the TEDLAR film was dyed only palely.

EXAMPLE 3

A substrate for dyeing was prepared by laminating a pressure-sensitive sheet comprised of the same TEDLAR film (thickness: 12 μm) as used in Example 1 having coated thereon an acrylic resin pressure-sensitive adhesive (No. 4580 hot-melt pressure-sensitive adhesive, produced by No-tape Industry Co., Ltd.) on a white tile plate.

The same transfer paper as used in Example 1 was contacted on this laminated substrate. After being heated at 180° C. for 20 seconds, the transfer paper was peeled off. When the TEDLAR film was forcibly peeled off from the tile plate, it was confirmed that the pressure-sensitive adhesive was dyed to a high color density while the TEDLAR film was dyed only palely.

EXAMPLE 4

A substrate for dyeing was prepared by laminating the TEDLAR UT film (an ultraviolet absorbent-containing film; thickness: 12 μm) described above on a flexible sheet comprised of a woven fabric impregnated with polyvinyl chloride resin using a polyester adhesive (KF-4000, produced by Toray Limited).

The same transfer paper as used in Example 1 was contacted on this laminated substrate. After being heated at 170° C. for 20 seconds, the transfer paper was peeled off. When the TEDLAR film was forcibly peeled off from the tile plate, it was confirmed that the flexible sheet was dyed to a high color density.

The dyed sheet was placed in an accelerated weather-O-meter to examine its resistance to ultraviolet rays. As a result, it was confirmed that no deterioration of the dyed color occurred after 1500 hours.

What is claimed is:

1. A process for producing a dyed article, comprising the steps of:

providing a substrate having laminated thereon a fluororesin film by means of an adhesive layer, said adhesive layer being disposed between said substrate and said fluororesin film;

said fluororesin film including, polyvinylidene fluoride, polytetrafluoroethylene, tetrafluoroethylene/perfluoroalkyl vinyl ether copolymer, tetrafluoroethylene/hexafluoropropylene copolymer, tetrafluoroethylene/ethylene copolymer, polychlorotrifluoroethylene or mixtures thereof;

contacting an exposed surface of said fluororesin film with a transfer means having a design formed thereon with a sublimating dye;

heating said transfer means to a temperature of about 100 degrees Celsius to 180 degrees Celsius for about 10 to 60 seconds to allow said dye to permeate said fluororesin film; and allowing said dye to be absorbed into said adhesive layer to thereby transfer the design of the transfer means thereto;

whereby said fluororesin film overlies said adhesive layer and protects said adhesive layer from abrasion.

2. The process as claimed in claim 1, wherein said substrate is selected from the group consisting of a fabric, a metal, a plastic, a wood, a ceramic, a hide, paper, and a release sheet.

3. The process as claimed in claim 1, wherein said adhesive layer comprises an adhesive or a pressure-sensitive adhesive selected from the group consisting of a polyester resin and an acrylic resin.

4. The process as claimed in claim 2, wherein said substrate is made of a material having an affinity for said sublimating dye.

5. The process as claimed in claim 4, wherein said material having an affinity for said sublimating dye is a material selected from the group consisting of a polyester resin and an acrylic resin.

6. A method for producing a dyed article, comprising the steps of:

applying to a substrate, in overlying relation thereto, an adhesive having an affinity for a sublimating dye;

applying to said adhesive, in overlying relation thereto, a fluororesin film lacking affinity for a sublimating dye so that said adhesive is disposed in sandwiched relation to said substrate and said fluororesin film;

said fluororesin film including, polyvinylidene fluoride, polytetrafluoroethylene, tetrafluoroethylene/perfluoroalkyl vinyl ether copolymer, tetrafluoroethylene/hexafluoropropylene copolymer, tetrafluoroethylene/ethylene copolymer, polychlorotrifluoroethylene or mixtures thereof;

contacting said fluororesin film with a transfer means having applied thereto a sublimating dye that forms a design, said contact being made on an exposed surface of said fluororesin film; and heating said transfer means at a temperature range of about 100 to 180 degrees Celsius for about 10 to 60 seconds so that the sublimating dye on said transfer means permeates said fluororesin film and migrates into said adhesive;

whereby said fluororesin film overlies said adhesive layer and protects said adhesive layer from abrasion.

7. The method of claim 6, further comprising the step of incorporating into said fluororesin film an ultraviolet absorbant.

8. The method of claim 1, further comprising the step of incorporating into said fluororesin film an ultraviolet absorbant.

* * * * *